United States Patent
Rebholz (10) Patent No.: US 10,814,405 B2
(45) Date of Patent: Oct. 27, 2020

(54) ORIENTING APPARATUS FOR TURNING TOOLS

(71) Applicant: GUEHRING KG, Albstadt (DE)

(72) Inventor: Felix Rebholz, Stetten-Frohnstetten (DE)

(73) Assignee: GUEHRING KG, Albstadt (DE)

( * ) Notice: Subject to any disclaimer, the term of this patent is extended or adjusted under 35 U.S.C. 154(b) by 0 days.

(21) Appl. No.: 16/204,481

(22) Filed: Nov. 29, 2018

(65) Prior Publication Data
US 2019/0176248 A1 Jun. 13, 2019

Related U.S. Application Data

(63) Continuation of application No. PCT/EP2017/063536, filed on Jun. 2, 2017.

(30) Foreign Application Priority Data

Jun. 2, 2016 (DE) .................. 10 2016 110 196

(51) Int. Cl.
*B23B 49/02* (2006.01)
*B25H 1/00* (2006.01)
(Continued)

(52) U.S. Cl.
CPC .............. *B23B 49/02* (2013.01); *B23B 49/00* (2013.01); *B23Q 17/2233* (2013.01);
(Continued)

(58) Field of Classification Search
CPC ....... B23B 49/00; B23B 49/02; B25H 1/0078; B25H 1/0085; B23Q 17/2233; B23Q 17/2241; Y10T 408/568; Y10T 408/56245
See application file for complete search history.

(56) References Cited

U.S. PATENT DOCUMENTS 1,590,643 A * 6/1926 Neuwelt .............. B25H 1/0078
408/112
2,360,942 A * 10/1944 Ellerstein ............. B25H 1/0078
408/112
(Continued)

FOREIGN PATENT DOCUMENTS

DE        9200961 U1 *   4/1992  ............ B25C 1/047
DE   102013100130       7/2014
(Continued)

OTHER PUBLICATIONS

International Search Report and Written Opinion of the International Searching Authority from a corresponding international patent application (PCT/EP2017/063536) dated Sep. 7, 2017, 10 pages.
(Continued)

*Primary Examiner* — Eric A. Gates
(74) *Attorney, Agent, or Firm* — Burr & Brown, PLLC (57) ABSTRACT

An orienting apparatus for arranging on a turning tool and for orienting a bore or depression to be introduced or for orienting a finishing step with respect to a normal to the surface of a workpiece, comprising a main body having a through-hole for receiving the tool shank or the tool tip in an orienting direction, and at least two probe elements for oriented support on the surface of the workpiece. As a result of an orienting movement of the orienting apparatus with respect to the normal to the surface of the workpiece, all of the probe elements form an electric circuit between an electrical current source contained in the main body and the signaling device, said electric circuit being closed by a series circuit activated by the probe elements. Furthermore, a method for orienting a bore or depression or for orienting a finishing step with an orienting apparatus.

29 Claims, 5 Drawing Sheets

(51) Int. Cl.
  *B23Q 17/22* (2006.01)
  *B23B 49/00* (2006.01)

(52) U.S. Cl.
  CPC ....... *B23Q 17/2241* (2013.01); *B25H 1/0078* (2013.01); *B23B 2260/128* (2013.01); *Y10T 408/21* (2015.01); *Y10T 408/568* (2015.01); *Y10T 408/56245* (2015.01)

(56) References Cited

U.S. PATENT DOCUMENTS

| | | | | |
|---|---|---|---|---|
| 2,483,060 | A * | 9/1949 | Niedelman | B25H 1/0078 408/112 |
| 3,464,295 | A * | 9/1969 | Gallion | B25H 1/0078 408/112 |
| 3,572,181 | A | 3/1971 | Schlegel | |
| 4,012,161 | A * | 3/1977 | Shultz | B23B 45/003 408/1 R |
| 9,248,510 | B2 | 2/2016 | Quintero | |
| 9,669,473 | B2 * | 6/2017 | Ponton | B23B 49/02 |
| 9,789,577 | B2 * | 10/2017 | Kraft | B25H 1/0028 |
| 2011/0222978 | A1 * | 9/2011 | Lange | B23B 49/02 408/115 R |
| 2013/0156519 | A1 | 6/2013 | Quintero | |
| 2020/0016666 | A1 * | 1/2020 | Rebholz | B23Q 16/001 |

FOREIGN PATENT DOCUMENTS

| | | |
|---|---|---|
| EP | 2604366 | 6/2013 |
| FR | 2679474 | 1/1993 |

OTHER PUBLICATIONS

DPMA Register, DE File No. 10 2016 110 196.6, 2 pages, Jul. 5, 2018.

\* cited by examiner

ORIENTING APPARATUS FOR TURNING TOOLS

The present invention relates to an orienting apparatus for arranging on a turning tool, in particular on a tool shank, for orienting a bore or depression to be introduced.

PRIOR ART

Orienting apparatuses or adjusting devices, respectively, are known from the prior art. They are used as bore template or bore aid. For the most part, it cannot be determined with the tripods or the like known from the prior art, whether the orienting apparatus bears on the workpiece in the desired position for the entire operating process.

In addition, DE 10 2013 100 130 A1 shows a device comprising a tripod comprising support control for machining by a tool. The support control takes place by means of one or a plurality of measuring sensors, which displays/display the measuring results of the support or non-support of feet of the tripod. An acoustic or visual signal serves as a display for a measuring result of each measuring sensor. A display value is thereby assigned to each signal of each measuring sensor. In the case of three feet, three signals are thus provided, which display the support of a foot, in each case independently of one another. The measuring sensor emits a separate signal for each support or non-support, respectively, of a foot. For an orientation, a worker has to take into account the signaling of all signals and has to pay increased attention for a correct orientation. In the known apparatus, a plurality of independent measuring sensors are thus arranged for determining the position of the tripod, wherein a plurality of control signals, in each case one control signal for each foot of the tripod, are output, all of which need to be taken into account in parallel by a worker. This makes an orientation cumbersome, because a plurality of signals need to be taken into account simultaneously and because an increased orientation time and a more cumbersome machining results thereby.

An exact orientation of turning machining operations are of high importance in particular in the vehicle construction, shipbuilding and aircraft construction due to a flawless and streamlined design of a workpiece surface.

The problem that a correct orientation of a boring process can only be attained by way of a high level of attention when taking into account the signals of a known orienting apparatus, thus results from the prior art. The orientation of the turning tool with respect to the workpiece is not ensured in the case of an incomplete or incorrect interpretation of the display.

It is likewise shown that known display methods are technically complex and require the installation of a plurality of measuring sensors comprising separate display mechanisms or the like. When using a tripod comprising three feet, three measuring sensors are thus required.

It is thus the object of the invention to propose an orienting apparatus, which can solve the above-specified problems of the prior art and which entails a simplified orientation with lower likelihood of misalignment and higher machining time.

The above-mentioned object is solved by way of an orienting apparatus according to the independent claim as well as according to the method according to the invention. Advantageous embodiments are the subject matter of the subclaims.

DISCLOSURE OF THE INVENTION

The subject matter of the invention is an orienting apparatus for arranging on a turning tool, in particular on a tool shank or a tool tip of a turning, milling, reaming or countersinking tool, for orienting a bore or depression to be introduced or for orienting a finishing step with respect to a normal to the surface of a workpiece. The orienting apparatus comprises a main body having a through-hole for receiving the tool shank or the tool tip in an orienting direction, and at least two, preferably at least three probe elements for oriented support on the surface of the workpiece.

It is proposed that, as a result of an orienting movement of the orienting apparatus with respect to the normal to the surface of the workpiece, all of the probe elements close an electric circuit between an electrical current source contained in the main body and the signaling device by a series circuit activated by one of the probe elements, in order to activate the signaling device by way of the closed electric circuit. Upon the mechanical contact of the probe elements with the surface of a workpiece or another surface, an electric circuit is closed by a series circuit, whereby a signaling device is activated only upon contacting of all of the probe elements and an orienting signal is output. In the case of the embodiment of the orienting apparatus with three sensing devices, an orthogonal orientation of the orienting apparatus and thus of the turning tool can be determined. An electrically simple switching circuit without electronic auxiliary elements can be used. Upon mechanical contact of all of the probe elements with the surface of the workpiece, a joint individual signaling device is thus activated and an individual orienting signal is output.

In other words, an orienting apparatus or adjusting device, respectively, as drilling air is proposed, which activates a signaling device by way of simple mechanical contact of all probe elements or foot, respectively, with the surface of a workpiece, whereby it is specified that the turning tool is located in the desired position. By the formation of separate probe elements instead of a large-area bearing surface, the region around the location to be machined on the surface of a workpiece can remain free, whereby chips or coolant can be discharged more easily. A transmission of the data to a computer can furthermore be provided, which serves for the quality control. By way of the activation of the signaling device via mechanical contract of the probe elements with a surface, a use of measuring sensors or other distance measuring devices is not required. An orienting apparatus, which is cost-efficient and which can be produced easily can thus be provided. If the bore or the like is to be evened out only in one direction, the orienting apparatus can be designed only with two probe elements. For the orienting in two spatial directions, the design with three or a plurality of probe elements is advantageous. The third spatial direction, i.e. the height, in which the turning tool is attached, is determined by way of the machine clearance above the surface of the workpiece and the depth of the machining section. The determination of an operating position in an orthogonal direction to a tangent on a surface of a workpiece, i.e. normal to the workpiece surface, is possible with such an orienting apparatus. This allows for the orienting of the turning tool on flat and curved surfaces. More than three probe elements can likewise be used. As a result of a length change of the probe elements or adjustment of the contact point of the probe elements, i.e. the relative switching position, in response to which an electric switch is closed in response to attaching the probe elements and insertion of the probe elements into the main body, angular deviations from the normal and thus specified oblique angles can be set for machining.

It is advantageous when all probe elements have a defined switching point, which, at the same time, is the stop point of the probe elements. This is so, because the probe elements can initially be displaced at least slightly in their length, upon mechanical contact with the surface of the workpiece they displace slightly into the main body and, as switch, close the series circuit starting at a definable contact pressure, wherein a stronger contact pressure also does not effect a change of the stop point or of the length, respectively, of the probe elements with respect to the main body. When attaching the orienting apparatus to the workpiece surface, at least a first probe element thus comes into mechanical contact with the workpiece surface. The probe element thereby dips slightly into the main body and, in the case of the maximum insertion depth—the stop point—effects a conductive connection of the switch as switching point. When reaching the switching point, the stop point, i.e. the maximum insertion depth of the probe element into the main body, which can be set in an advantageous manner in order to be able to set orienting positions, is reached at the same time. If the second, third or further probe elements is attached subsequently, all switching points can be activated as a result of a high contact pressure, such that an individual orienting signal is output. An increase of the contact pressure also does not change the relative position of the main body to the probe elements. When reaching the switching point, a resilience of the stop point is not at hand. An exact orientation is thus possible in that, as a result of sufficiently high contact pressure, all probe elements bear on the workpiece surface and an output signal is output by the signaling device.

In an advantageous embodiment, an electric switching point and thus the stop point of at least one probe element can be positionally adjustable in the bearing direction towards the surface of the workpiece, in particular screwable or displaceable relative to the surface of the workpiece by means of a contact adjusting screw, such that the orienting direction can be set with respect to the normal to a surface of a workpiece. The switching point, i.e. the relative position of probe element to the main body, at which an electrical contact is triggered by the respective probe element, can be set thereby, wherein the stop point, i.e. the maximum insertion depth of the probe element into the main body, is set at the same time. It is very easy thereby to set an orientation to the normal of the workpiece surface. If the switching point is set identically for each probe element, an orientation along the normal is attained. If the switching points are set differently, a respective angularly and directionally adjustable deviation to the normal results, such that oblique machining with respect to the workpiece surface can also be set. It is thus not necessary to exert a high pressure on the surface of the workpiece by means of the orienting apparatus, in order to ensure that the apparatus bears on completely. The switching point can be set in a such a sensitive way by means of the contact adjusting screw that the signaling device is already activated upon slight contact of the orienting apparatus with the surface of the workpiece. For this purpose, the contact adjusting screw can preferably be displaced and set in a direction parallel to the direction of the inserted tool shank.

In an advantageous embodiment, at least one spring contact sheet, which can be mechanically contacted with at least one probe element, can be electrically contacted by means of a screw contact sheet via the contact adjusting screw. The spring contact sheet can deform in such a way that no contact is present between spring contact sheet and contact adjusting screw in the initial state, while the displacement of the sensing devices can generate a deformation of the spring contact sheet when the orienting apparatus bears on a surface and upon contact of the sensing devices with the surface, such that a contact between spring contact sheet and contact adjusting screw is brought about. The relative distance of the contact adjusting screw from the spring element determines the position of the switching point. By means of an axial adjustment of the contact adjusting screw, either by means of screw or axial displacement movement, the switching point can be set in a highly accurate manner and the machining direction can thus be set. The initial state describes the state prior to attaching the orienting apparatus on a surface here.

In an advantageous embodiment, the contact adjusting screw can be capable of being accessed and set from the top side of the main body and can be arranged in the main body in the orienting direction. When the probe elements of the orienting apparatus bear and press on the workpiece surface, a setting of the machining device can already be made thereby by adjusting the axial position of the contact adjusting screw, without having to remove the orienting apparatus from the workpiece for an adjustment.

In an advantageous embodiment, at least two contact adjusting screws can be electrically connected via a joint spring contact sheet, and at least two contact adjusting screws can be electrically connected to one another via a screw contact sheet. An electric series circuit of the individual contact points, at which the probe elements establish a mechanical contact, can be attained very easily by means of the electrical connection between at least two contact adjusting screws with a minimal number of components, whereby a closed electric circuit is attained.

In an advantageous embodiment, the at least one spring contact sheet can be arranged parallel to the at least one screw contact sheet in the main body, wherein the screw contact sheet can be electrically contacted by means of the spring contact sheet via at least one contact adjusting screw by means of a spring movement, which is triggered by the probe element. Based on a workpiece surface, spring contact sheet and screw contact sheet can thus be arranged parallel and on top of one another, whereby the contact adjusting screw is oriented axially in the direction of the workpiece surface and set the switching point. A current flow comes about via the screw contact sheet, the contact adjusting screw and in response to bending the spring contact sheet by means of the probe element upon contact of the spring contact sheet with the contact adjusting screw. A mechanically simple and robust setup is thus attained. The spring contact sheet and the screw contact sheet can be formed differently or constructionally identically. They can likewise be made of the same material. A plurality of spring contact sheets and a plurality of screw contact sheets can also be present, wherein they can likewise be formed in a constructionally identical manner. The course of the current flow within the orienting apparatus is preferably determined via the geometry of the spring contact sheets and screw contact sheets.

In an advantageous embodiment, the electrical current source and/or the signaling device can be in electrical contact with the at least one spring contact sheet and/or at least one screw contact sheet. The signaling device can furthermore be connected to a contact of the current source. A series circuit is proposed, comprising minimal electrical wiring and a robust and simple setup with a minimal number of electrical connections. An orienting signal can thus be activated only upon of a mechanical contact of all of the probe elements with the surface of the workpiece, whereby an electric circuit is closed via the at least one spring contact sheet and/or at least one screw contact sheet.

In an advantageous embodiment, the at least one screw contact sheet can have bores, into which the contact adjusting screw can be inserted, soldered or screwed, whereby a permanently-conductive connection is established between the screw contact sheet and the contact adjusting screw. The regions, in which a mechanical contact can be established between the spring contact sheet and the respective contact adjusting screw as a result of a movement of the probe elements thereby represent the only regions, which can cause an interruption or a completing of the electric circuit. Due to the fact that the screw contact sheets are fixedly connected to the contact adjusting screws in an electrically conductive manner, the movable locations in the orienting apparatus are minimized and the electrical robustness is increased, whereby the operability is optimized.

In an advantageous embodiment, at least one contact adjusting screw can be positionally secured via a locking screw. The sensibility of the contact point can thus be set with a high accuracy and an unintentional adjusting of the orientation setting can be prevented. If all contact adjusting screws, preferably all three contact adjusting screws, are each fixed with a locking screw, the position with respect to a normal to the surface of a workpiece can be set with a high accuracy. The locking screw can be attached radially to the contact adjusting screw, in order to prevent a positional change. The locking screw can be accessible from the outer circumference of the main body, and can be released by means of the contact adjusting screw prior to a change of the orientation. The introduction of bores or depressions with a low error tolerance with respect to the orientation direction can be attained thereby.

In an advantageous embodiment, the at least two probe elements, preferably at least three probe elements, can have the same length L. The number of the identical elements is increased thereby and an orientation along the normal of a workpiece surface is simplified. An optimal orientation of the bore or of the depression can thereby be attained in a workpiece.

In an advantageous embodiment, the main body can be formed in a circular cylindrical manner or in a partially circular cylindrical manner. As a result of different geometries of the cross section of the main body, the minimal distance of the probe elements to the edge of the main element can be determined. The minimal distance to a boundary wall or to a further workpiece element, which is arranged at an angle to the surface, to which the orienting apparatus with the probe elements is to be attached, is also determined thereby.

The distance of a bore, depression or the like to a boundary wall of the workpiece will also be minimized thereby, because the main body comes into contact with the boundary wall at a minimal distance. To be able to introduce a bore or rotational machining in an oriented manner as closely as possible at such a boundary, the main body can be flattened on one side or can be designed with a special cross-sectional geometry, in order to provide an orientation in a shape-complementary manner to the surface geometry of the workpiece. The geometry of the main body can likewise serve to orient the bore or depression, when the main body comes into contact with a boundary wall or a further workpiece element at one or at a plurality of sides. An adaptation of the main body geometry is advantageous in particular in the case of complex workpiece geometries.

In an advantageous embodiment, a guide sleeve can be inserted into the through-hole of the main body, wherein the guide sleeve can have different inner diameters d2, such that a tool shank or a tool tip of a different diameter >=d2 can be inserted so as to be capable of being oriented. The guide sleeve can for example be screwed, clamped or adhered into the orienting apparatus. It is also conceivable that the guide sleeve is supported in the main body in a freely rotatable manner and tracks the rotational movement of the turning tool. By way of guide sleeves, which can be inserted differently, an exact position of the turning tool in the orienting apparatus is at hand even in the case of different tool diameters, and the orienting apparatus can be used in a flexible and universal manner for different tool diameters.

In an advantageous embodiment, the signaling device can be arranged on the top side of the main body and can be formed as optical, haptic and/or as acoustic signal generator, preferably as LED signal generator. From this side, the signal generator is optimally visible for an operator during the operation of the turning tool. The signaling device can likewise be attached at a lateral position on the main body or can be transmitted via a connecting cable or wirelessly to an operator, if the orienting apparatus is not accessible by an operator during the operation. It is thus conceivable to transmit an acoustic or optical signal to an operator via an electrical connecting line even under difficult acoustic or optical conditions.

A method for orienting a bore or depression or for orienting a finishing step with an orienting apparatus according to the invention is also subject matter of the invention.

It is proposed that the method comprises the following steps:

sliding the orienting apparatus onto a tool shank (14) of a turning tool;

attaching the turning tool to a surface of a workpiece at a desired angle α to the workpiece; pressing the orienting apparatus to the surface of the workpiece, such that a mechanical contact is established between all of the probe elements and the surface of the workpiece;

slightly tilting or turning the rotating tool, until the signaling device outputs an orienting signal;

carrying out or finishing, respectively, the bore or depression in this position.

This allows for the orientation of bores, depressions or the like on flat and curved surfaces in a very simple, intuitively learnable and fail-safe operation.

It goes without saying that the individual features can be combined with one another, wherein further advantageous effects can appear, which go beyond the sum of the individual effects.

DRAWINGS

Further advantages result from the present drawing descriptions. Exemplary embodiments of the invention are illustrated in the drawings. The drawings, the description and the claims include numerous features in combination. The person of skill in the art will advantageously also consider the features individually and will combine them to useful further combinations.

In the figures.

Identical or similar components are numbered with identical reference numerals in the figures.

Figure 1:
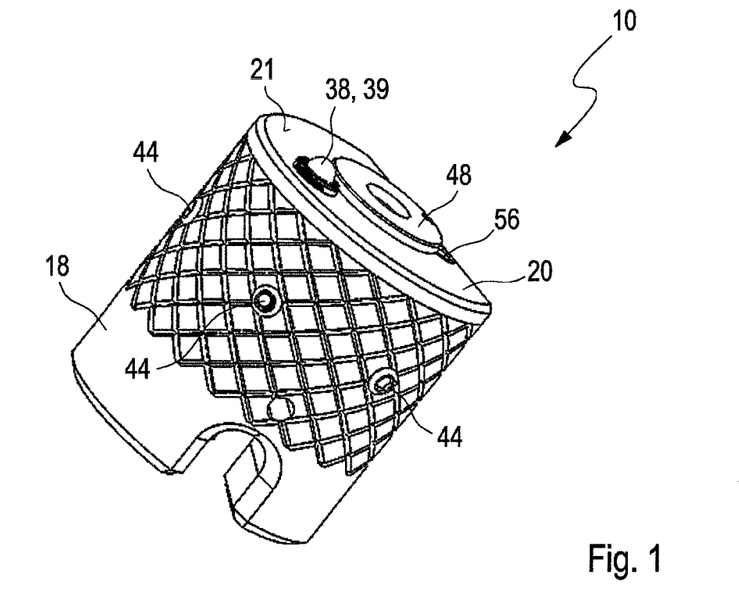
FIG. 1 shows an outer view of an embodiment of an orienting apparatus according to the invention.

FIG. 1 shows a three-dimensional illustration of an embodiment of an orienting apparatus 10. In the outer view, the main body 18, the cover 20 of the main body 18, the signaling device 38, the locking screws 44, as well as a guide sleeve 48 for insertion of a tool shank (not illustrated) are visible. The main body 18 has a partially circular cross section, wherein a flattening is formed on one side. The orienting apparatus 10 can thus also be used in corner regions or edge regions, respectively, of a workpiece comprising an adjoining wall or step, wherein regions close to the adjoining wall can also be machined. The main body 18 has recesses on the side, which faces the workpiece. A removal of chips or lubricant during the rotation of a used tool can be ensured thereby. The surface of the main body 18 is formed in a structured manner, in order to facilitate the assembly on a tool shank 14. The signaling device 38 is attached to the cover 20 in the form of an LED signal generator 39, which can output an orienting signal. The locking screws 44 serve for the fixation of the contact adjusting screws (not visible) for setting the sensibility of the switching point.

Figure 2:
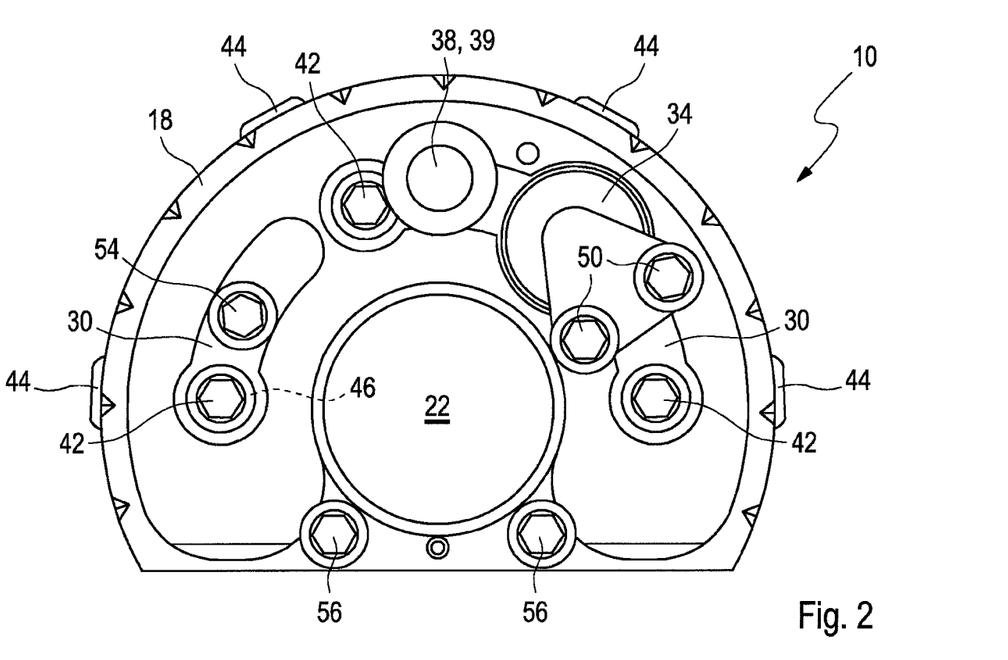
FIG. 2 shows a top view of an embodiment of an orienting apparatus according to the invention according to FIG. 1 without cover of the main body.

FIG. 2 shows a top view without cover 20 of the main body 18 of the embodiment of FIG. 1. The fixing screws 56 for the cover 20 as well as the signaling device 38 are additionally illustrated in this top view. In a top view, the screw contact sheets 30, the screw heads of the contact adjusting screws 42 as well as the screw heads of the fixing screws 54 of the screw contact sheets 30 are visible in the interior of the main body 18. The orienting apparatus 10 has two separate screw contact sheets 30, wherein two contact adjusting screws 42 are attached in a screw contact sheet 30. The electrical current source 34, which is mounted with the fixing screws 50, is likewise in contact with this screw contact sheet 30. The signaling device 38 is furthermore contacted with this screw contact sheet 30. The locking screws 44, which lock the contact adjusting screws 42 in a certain position, are visible outside of the main body 18. A through-hole 22 for the guide-through for a guide sleeve or for the direct insertion of a tool is provided in the interior of the main body 18.

Figure 3:
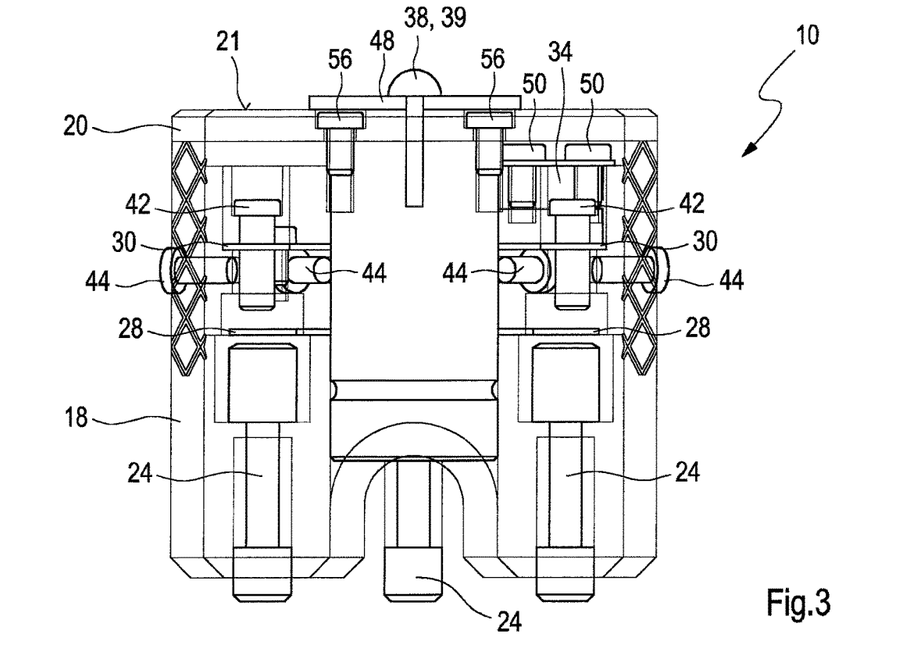
FIG. 3 shows a wireframe illustration of a side view of an embodiment according to FIG. 1 with inserted guide sleeve.

FIG. 3 shows a wireframe illustration of an embodiment according to FIG. 1. A side view of the orienting apparatus 10 from the side of the flattened main body 18, which forms the partial circle, is illustrated. The probe elements 24 protrude beyond the main body 18 on the underside, wherein the probe elements 24 are supported so as to be capable of being displaced in the vertical direction towards a workpiece surface, such that a contact between probe elements 24, spring contact sheet 28, and contact adjusting screw 42 is possible. The spring contact sheets 28 are arranged parallel offset to the screw contact sheets 30, wherein the contact adjusting screws 42 are inserted through or screwed into the screw contact sheets 30. The contact of the contact adjusting screws 42 to the spring contact sheets 28 takes place by means of a vertical displacement of the probe elements 24, wherein the spring contact sheets 28 are pushed against the contact adjusting screws 42. The electric circuit is closed via the contact between workpiece (not illustrated), probe elements 24, spring contact sheet 28, contact adjusting screw 42, and screw contact sheet 30. As a result of this, the spring contact sheets 28 and screw contact sheets 30 are formed in several pieces to form a switchable connection between the individual segment sections.

Figure 4:
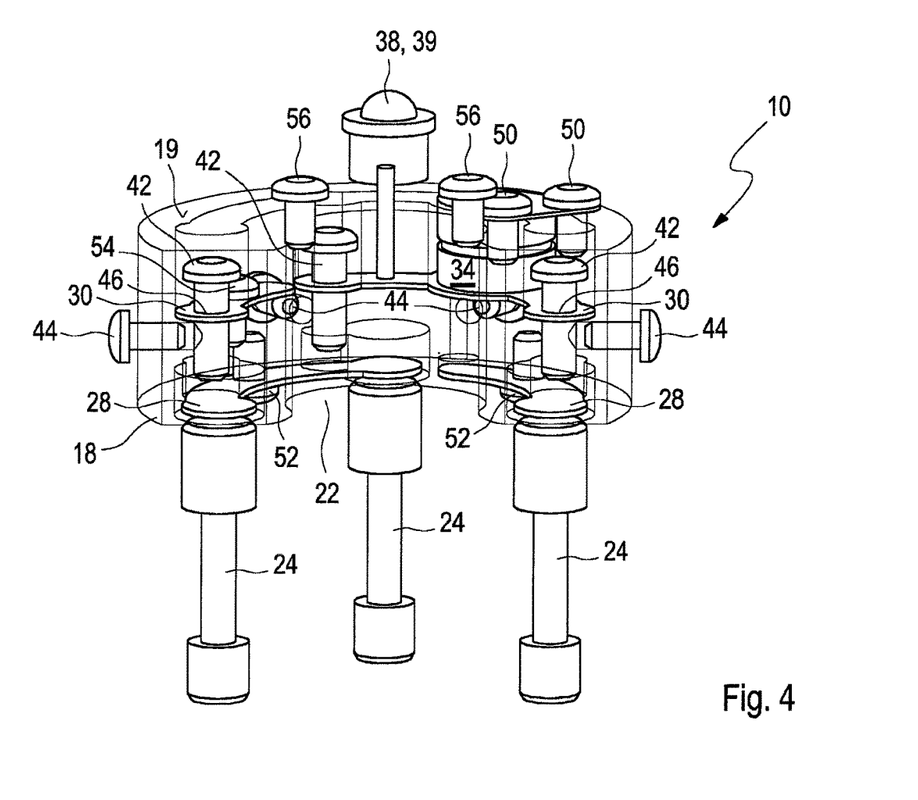
FIG. 4 shows a wireframe illustration of a longitudinal section of an embodiment as well as cross section through the main body according to FIG. 1.

FIG. 4 shows a detailed illustration of the inner setup of the orienting apparatus 10. The contact adjusting screws 42 can be accessed from the top side via recesses in the interior of the main body 18, and can be inserted into the screw contact sheets 30 from there. From the outer side of the main body 18, the contact adjusting screws 42 can be fixed in a desired vertical position by means of a corresponding locking screw 44 each, in order to secure an orienting direction with respect to the normal of a workpiece surface. If all switching points are identical, the chip machining is carried out exactly in the normal. The sensibility of the orienting apparatus 10, i.e. the switching point when the electric circuit 36 is closed, is determined via this vertical position. The orienting apparatus 10 can thus be adapted for a certain contact pressure of an operator. The middle probe element 24 is not arranged in a line of action with the corresponding contact adjusting screw 42, the two other probe elements 24 are located in one plane with the corresponding contact adjusting screw 42. The signaling device 38 is conductively connected to a screw contact sheet 30. The fixing screws 50 of the electrical current source 34 as well as the fixing screws 56 of the cover (not illustrated) are likewise illustrated in this view.

Figure 5:
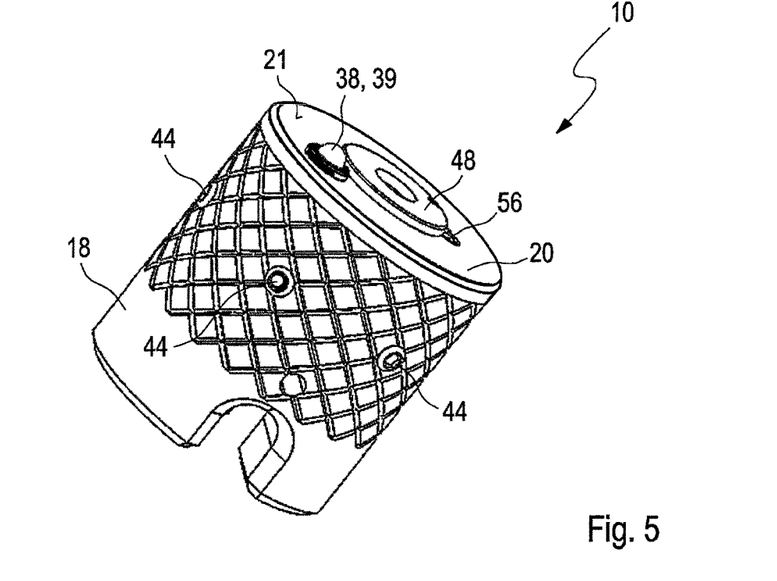
FIG. 5 shows an outer view of a further embodiment of an orienting apparatus according to the invention.

FIG. 5 shows a further embodiment of an orienting apparatus 10. The main body 18 has a circular cross section and is thus suitable for a machining of workpiece surfaces, which are not structurally limited. In the remaining embodiments, this illustration correspond to that of FIG. 1.

Figure 6:
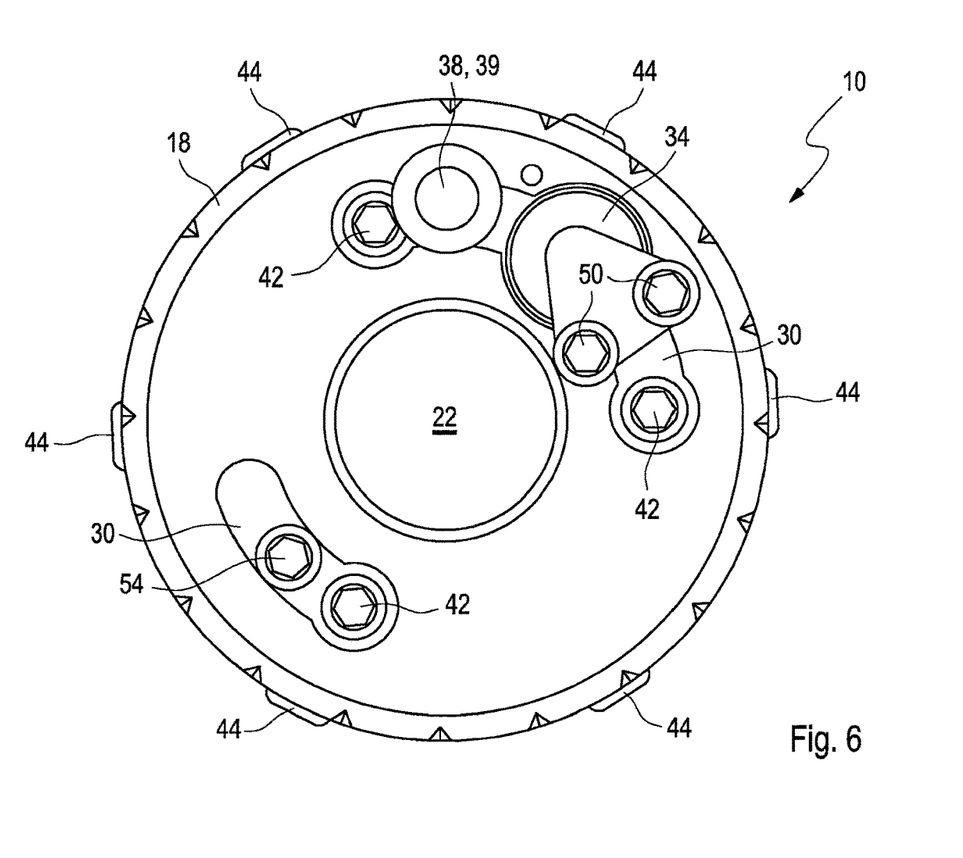
FIG. 6 shows a top view of an embodiment of an orienting apparatus according to the invention according to FIG. 5 without cover of the main body.

A top view onto an embodiment from FIG. 5 without cover 20 of the main body 18 is illustrated in FIG. 6. The main body 18 has a circular cross section, wherein the contact adjusting screws 42 are arranged on a third of the circumference each. In the illustration, the screw contact sheets 30 are visible, the spring contact sheets 28 are arranged in a plane below the screw contact sheets 30, which is offset in parallel, and are not illustrated in this view. A screw contact sheet 30 establishes a conductive connecting between two contact adjusting screws 42, the electrical current source 34, and the signaling device 38. The electrical current source 34 is attached to the main body 18 via the fixing screws 50. The further screw contact sheet 30 is attached to the main body 18 via a fixing screw 54. The locking screws 44 serve the purpose of fixing the contact adjusting screws 42 in a desired position.

Figure 7:
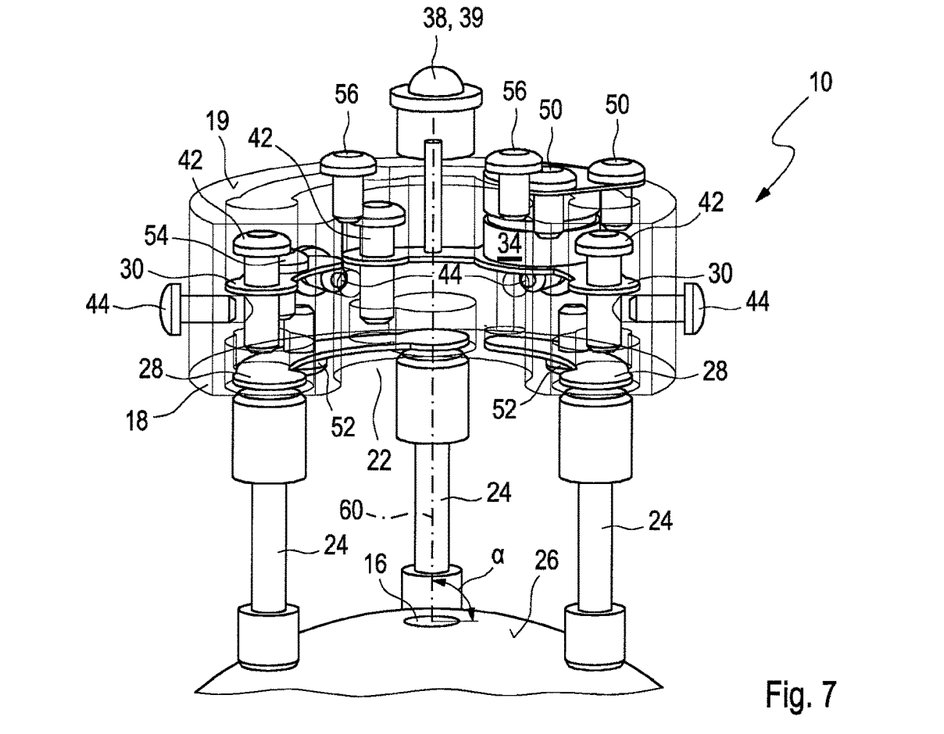
FIG. 7 shows a wireframe illustration of a longitudinal section of an embodiment as well as cross section through the main body according to FIG. 1 in the attached state on a workpiece.
Figure 8:
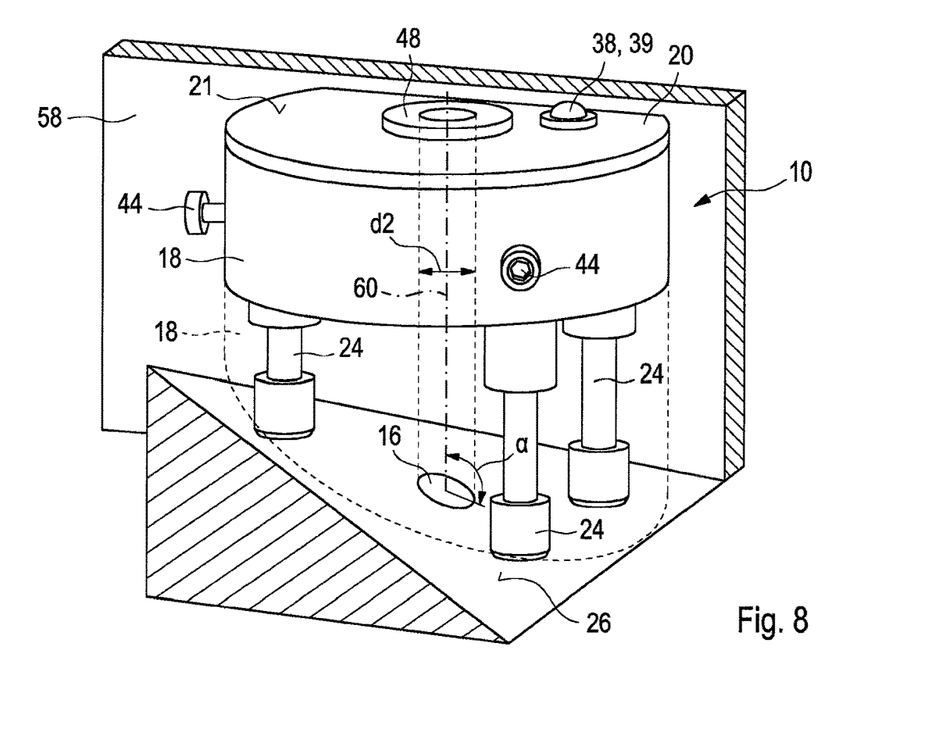
FIG. 8 shows an outer view of a further embodiment of an orienting apparatus according to the invention in the attached state on a workpiece.

FIGS. 7 and 8 each show a further embodiment of an orienting apparatus 10 in the supported state on a surface 26 of a workpiece. The workpiece in FIG. 7 has a curved surface 26, FIG. 8 illustrates a sloped surface 26. In the case of FIG. 7, the bore, the depression or the finishing is to take place in a direction orthogonally to a tangent of the surface 26. In the case of FIG. 8, the machining is to take place at an angle α>90°, such that for example the bore cannot take place orthogonally to the surface 26, but at an angle α>90° to the surface 26.

FIG. 7 shows an embodiment of an orienting apparatus 10 according to FIG. 1. The illustration of the orienting apparatus 10 is comparable to FIG. 4 in a wireframe illustration, wherein the main body is only illustrated in the upper region. The workpiece 16 has a curved surface 26, on which a bore 16 can be introduced in the orthogonal direction, identified by the normal 60, to a tangent on the surface 26 of the workpiece, i.e. at an angle α=90°. For this purpose, all of the probe elements 24 have an identical length, such that, upon contact of the probe elements 24 with the surface 26 of the workpiece, this orthogonal direction is reached when an orienting signal comes from the signaling device 38 in the form of an LED signal generator 39.

In FIG. 8, a bore is to be introduced in a direction α>90° with respect to the surface of the workpiece 26. The orienting apparatus 10 is illustrated in the upper region as outer view and in the region of the probe elements 24 without the main body 18. For this purpose, the probe elements 24 have different lengths, wherein, in the present embodiment, one probe element 24 is formed to be shorter. It lends itself to provide for a simple exchange of the probe elements 24, e.g. by means of a screw thread, so as to be able to screw probe elements 24 of different lengths into the main body 18 preferably without tools. In the alternative, the probe elements 24 can be formed of the same lengths, but the switching point, i.e. the insertion distance of the probe elements 24, at which an electrical contacting between spring contact sheet 28 and contact adjusting screw 42, can differ as a result of an axial adjusting of the position of the contact adjusting screw 42 in the main body 18. This lends itself in particular when a row of bores 16, depressions 17 or other finishing are to take place in the vicinity of a boundary wall 58 or another spatial boundary of a surface 26 of a workpiece. It lends itself to flatten the main body 18 of the orienting apparatus 10 on one side in such a way that, in combination with the arrangement of the different lengths of the probe elements 24, the desired machining direction can be attained. For this purpose, the orienting apparatus 10 should be in contact with boundary wall 58 with the flattened side at each machining step, wherein the signaling device 38 should simultaneously display an orienting signal. A machining can then take place in the desired machining direction at an angle α.

Figure 9:
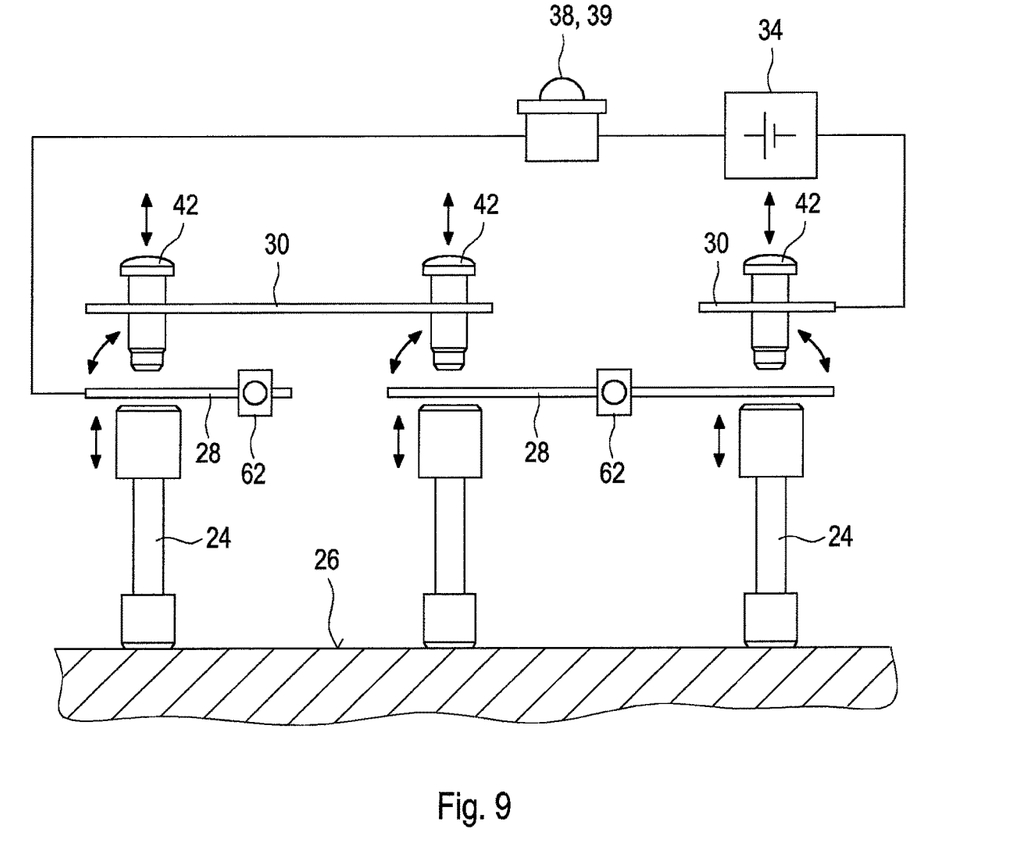
FIG. 9 shows a schematic illustration of the elements of the series circuit in an embodiment of an orienting apparatus according to the invention.
Figure 10A:
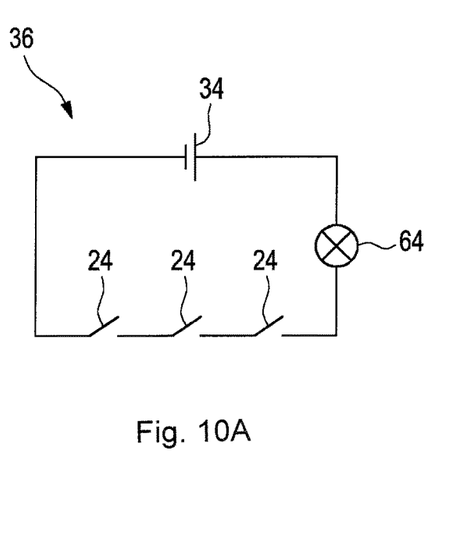
FIGS. 10A and 10B show two series circuits for use in an embodiment of an orienting apparatus according to the invention.
Figure 10B:
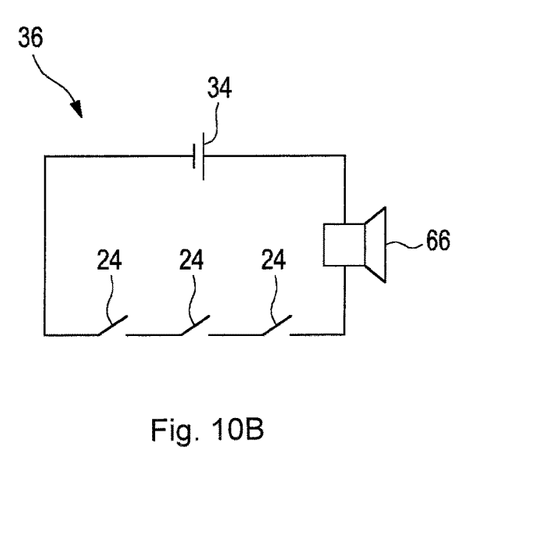

FIGS. 9, 10A and 10B show, schematically, the components of a series circuit in the embodiment of an orienting apparatus according to the invention.

For this purpose, only the probe elements 24, the spring contact sheets 28 and the screw contact sheets 30, the contact adjusting screws 42 as well as the signaling device 38 are illustrated in FIG. 9. The contact adjusting screws 42 as well as the spring contact sheets 28 and the screw contact sheets 30 are pushed against the probe elements 24 via a movement by an operator (illustrated by means of the arrows), wherein the probe elements 24 hit a surface 26 of the workpiece and are limited in a further vertical movement. A contact between the contact adjusting screws 42, the spring contact sheet 28 and the probe elements 24 is created thereby, wherein the electric circuit 36 is closed in connection with the screw contact sheet 30 and the surface 26 of the workpiece.

FIG. 10A shows the electrotechnical setup of such a series circuit with three probe elements and an optical signal generator 64. FIG. 10B shows the electrotechnical setup of such a series circuit with three probe elements and an acoustical signal generator 66. The circuit can manage without complex components and can thus be used in a robust and simple manner.

REFERENCE LIST 10 orienting apparatus
14 tool shank
16 bore
17 depression
18 main body
19 top side of the main body
20 cover of the main body
21 top side of the cover
22 through-hole
24 probe elements
26 surface of the workpiece
28 spring contact sheet
30 screw contact sheet
34 electrical current source
36 electric circuit
38 signaling device
39 LED signal generator
42 contact adjusting screw
44 locking screw
46 bore of the screw contact sheet
48 guide sleeve
50 fixing screw for battery
52 fixing screw for first contact sheet
54 fixing screw for second contact sheet
56 fixing screw for cover of the main body
58 boundary wall
60 normal to the surface of the workpiece
62 spring contact bearing
64 optical signal generator
66 acoustic signal generator

The invention claimed is:
1. An orienting apparatus for arranging on a turning tool, for orienting a bore or depression to be introduced or for orienting a finishing step with respect to a normal to the surface of a workpiece, comprising a main body having a through-hole for receiving a tool shank or a tool tip in an orienting direction, and at least two probe elements for oriented support on the surface of the workpiece, wherein as a result of an orienting movement of the orienting apparatus with respect to the normal to the surface of the workpiece, all of the probe elements form an electric circuit between an electrical current source contained in the main body and a signaling device, said electric circuit being closed by a series circuit activated by one of the probe elements, in order to activate the signaling device by way of the closed electric circuit, such that, upon mechanical contact of all of the probe elements with the surface of the workpiece and movement of each of the probe elements by a distance in the normal direction to complete respective electric circuits, the signaling device is activated and an orienting signal is output, wherein:
an electric switching point of at least a first probe element is positionally adjustable in the normal direction towards the surface of the workpiece, relative to the surface of the workpiece by means of a contact adjust- ing screw, such that the position of the first probe element can be set with respect to the surface of a workpiece, and at least one spring contact sheet, which can be mechanically contacted with at least one probe element, can be electrically contacted by means of at least one screw contact sheet via the contact adjusting screw.

2. The orienting apparatus according to claim 1, wherein each of the probe elements has a respective switching point, which is at a stop point of movement of the probe elements in the normal direction.

3. The orienting apparatus according to claim 1, wherein the contact adjusting screw can be accessed and set from a top side of the main body, and is arranged in the orienting direction in the main body.

4. The orienting apparatus according to claim 1, wherein at least two contact adjusting screws can be electrically connected via a joint spring contact sheet, and at least two contact adjusting screws are electrically connected to one another via at least a first of the at least one screw contact sheet.

5. The orienting apparatus according to claim 1, wherein the at least one spring contact sheet is arranged parallel to the at least one screw contact sheet in the main body, wherein at least one of the at least one screw contact sheet can be electrically contacted by means of at least one of the at least one spring contact sheet via at least one contact adjusting screw by means of a spring movement, which is triggered by the probe element.

6. The orienting apparatus according to claim 1, wherein the electrical current source and/or the signaling device is in electrical contact with the at least one spring contact sheet and/or at least one screw contact sheet.

7. The orienting apparatus according to claim 1, wherein the at least one screw contact sheet has bores, into which the contact adjusting screw can be inserted, soldered or screwed, whereby a permanently-conductive connection is established between at least one of the at least one screw contact sheet and the contact adjusting screw.

8. The orienting apparatus according to claim 1, wherein at least one contact adjusting screw can be positionally secured via a locking screw.

9. The orienting apparatus according to claim 1, wherein the at least two probe elements have a same length.

10. The orienting apparatus according to claim 1, wherein the main body is circular cylindrical or partially circular cylindrical.

11. The orienting apparatus according to claim 1, wherein a guide sleeve can be inserted into the through-hole of the main body, wherein the guide sleeve can have different inner diameters, such that a tool shank or a tool tip of a different diameter can be inserted so as to be capable of being oriented.

12. The orienting apparatus according to claim 1, wherein the signaling device is arranged on a top side of the main body and is formed as an optical, a haptic and/or an acoustic signal generator.

13. The orienting apparatus according to claim 12, wherein the signaling device is formed as an LED signal generator.

14. A method for orienting a bore or depression or for orienting a finishing step with an orienting apparatus according to claim 1, comprising:

sliding the orienting apparatus onto a tool shank of a turning tool;

attaching the turning tool to a surface of a workpiece at a desired angle to the workpiece;

pressing the orienting apparatus to the surface of the workpiece, such that a mechanical contact is established between all of the probe elements and the surface of the workpiece;

slightly tilting or turning the rotating tool, until the signaling device outputs an orienting signal at a properly oriented position of the tool;

carrying out or finishing, respectively, the bore or depression in the properly oriented position of the tool.

15. The orienting apparatus according to claim 1, wherein the main body has at least three probe elements.

16. The orienting apparatus according to claim 15, wherein the at least three probe elements have a same length.

17. The orienting apparatus according to claim 1, wherein at least the first probe element is screwably adjustable or displaceable in the normal direction.

18. An orienting apparatus for arranging on a turning tool, for orienting a bore or depression to be introduced or for orienting a finishing step with respect to a normal to the surface of a workpiece, comprising a main body having a through-hole for receiving a tool shank or a tool tip in an orienting direction, and at least two probe elements for oriented support on the surface of the workpiece, wherein as a result of an orienting movement of the orienting apparatus with respect to the normal to the surface of the workpiece, all of the probe elements form an electric circuit between an electrical current source contained in the main body and a signaling device, said electric circuit being closed by a series circuit activated by one of the probe elements, in order to activate the signaling device by way of the closed electric circuit, such that, upon mechanical contact of all of the probe elements with the surface of the workpiece and movement of each of the probe elements by a distance in the normal direction to complete respective electric circuits, the signaling device is activated and an orienting signal is output, wherein:

an electric switching point of at least a first probe element is positionally adjustable in the normal direction towards the surface of the workpiece, relative to the surface of the workpiece by means of a contact adjusting screw, such that the position of the first probe element can be set with respect to the surface of a workpiece, and at least one contact adjusting screw can be positionally secured via a locking screw.

19. An orienting apparatus for arranging on a turning tool, for orienting a bore or depression to be introduced or for orienting a finishing step with respect to a normal to the surface of a workpiece, comprising a main body having a through-hole for receiving a tool shank or a tool tip in an orienting direction, and at least two probe elements for oriented support on the surface of the workpiece, wherein as a result of an orienting movement of the orienting apparatus with respect to the normal to the surface of the workpiece, all of the probe elements form an electric circuit between an electrical current source contained in the main body and a signaling device, said electric circuit being closed by a series circuit activated by one of the probe elements, in order to activate the signaling device by way of the closed electric circuit, such that, upon mechanical contact of all of the probe elements with the surface of the workpiece and movement of each of the probe elements by a distance in the normal direction to complete respective electric circuits, the signaling device is activated and an orienting signal is output, an electric switching point of at least a first probe element positionally adjustable, independent of at least one other probe element, in the normal direction towards the surface of the workpiece, relative to the surface of the workpiece by means of a contact adjusting screw, such that the position of the first probe element can be set with respect to the surface of a workpiece.

20. The orienting apparatus according to claim 19, wherein each of the probe elements has a respective switching point, which is at a stop point of movement of the probe elements in the normal direction.

21. The orienting apparatus according to claim 19, wherein the at least two probe elements have a same length.

22. The orienting apparatus according to claim 19, wherein the main body is circular cylindrical or partially circular cylindrical.

23. The orienting apparatus according to claim 19, wherein a guide sleeve can be inserted into the through-hole of the main body, wherein the guide sleeve can have different inner diameters, such that a tool shank or a tool tip of a different diameter can be inserted so as to be capable of being oriented.

24. The orienting apparatus according to claim 19, wherein the signaling device is arranged on a top side of the main body and is formed as an optical, a haptic and/or an acoustic signal generator.

25. The orienting apparatus according to claim 24, wherein the signaling device is formed as an LED signal generator.

26. The orienting apparatus according to claim 19, wherein the main body has at least three probe elements.

27. The orienting apparatus according to claim 26, wherein the at least three probe elements have a same length.

28. The orienting apparatus according to claim 19, wherein at least the first probe element is screwably adjustable or displaceable in the normal direction.

29. An orienting apparatus for arranging on a turning tool, for orienting a bore or depression to be introduced or for orienting a finishing step with respect to a normal to the surface of a workpiece, comprising a main body having a through-hole for receiving a tool shank or a tool tip in an orienting direction, and at least two probe elements for oriented support on the surface of the workpiece, wherein as a result of an orienting movement of the orienting apparatus with respect to the normal to the surface of the workpiece, all of the probe elements form an electric circuit between an electrical current source contained in the main body and a signaling device, said electric circuit being closed by a series circuit activated by one of the probe elements, in order to activate the signaling device by way of the closed electric circuit, such that, upon mechanical contact of all of the probe elements with the surface of the workpiece and movement of each of the probe elements by a distance in the normal direction to complete respective electric circuits, the signaling device is activated and an orienting signal is output, at least the first probe element screwably adjustable or displaceable in the normal direction.

* * * * *